United States Patent Office 3,250,746
Patented May 10, 1966

3,250,746
METHOD OF POLYMERIZATION OF ACETALDE-
HYDE AND FORMALDEHYDE IN SOLUTION
Maurice Joseph Amand Letort, Paris, and Bernard Fleu-
reau, Verneuil-en-Halatte, France, assignors to Char-
bonnages de France, Paris, France, an institution of
France
No Drawing. Filed July 12, 1962, Ser. No. 209,315
Claims priority, application France, July 13, 1961,
868,147
5 Claims. (Cl. 260—67)

The present invention relates to improvements in methods of polymerization of acetaldehyde and formaldehyde in solution.

In accordance with these improvements, the present invention consists in causing the formaldehyde and the acetaldehyde to react in the presence of a solvent of the two monomers which is not a solvent of the polymers and copolymers of these monomers.

According to further characteristic features:

The solvent is a polar solvent;
The solvent is an anhydrous solvent;
The solvent is of the ether-oxide type or a heterocyclic oxygenated polar compound;
The solvent is tetra-hydrofuran;
The polymerization is carried out under vacuum or under an inert atmosphere;
The polymerization is effected at low temperature in the presence of a polymerization catalyst of one of the monomers;
The catalyst is a polymerization catalyst of formaldehyde.

The invention is also directed to naphthalene-sodium as a new catalyst of the reaction and also this latter compound as a polymerization catalyst of formaldehyde.

Without it being possible to give any sure explanation, in order to obtain the good results according to the invention, it is favourable to utilize a polar solvent. On the contrary to nonpolar solvents, the applicants have been able to show that polar solvents enable the initiation of polymerization to be controlled by causing it to occur at will by the fact of the introduction of the initiator and by this fact only.

The applicants have also been able to find that the utilization of a polar solvent leads to the very advantageous industrial result of being able to proceed with the reaction of copolymerization of formaldehyde and acetaldehyde at predetermined initial concentrations.

Finally it would appear that in the method according to the invention the polar solvent has a favourable action on the process following which the carbonyl radical is polarized, which from all appearances facilitates the copolymerization reaction.

The following example will make the method of the invention and its application more clearly understood.

In the preparation of a copolymer by a method according to the invention, there has been adopted for the tests, an equipment which is composed of the two following main parts, namely a reaction vessel and an apparatus for dehydrating the solvent.

The reaction vessel is composed of a container with a large opening having four necks and provided with an agitator having an air-tight joint, a lock-chamber with a cock permitting the introduction of the monomers, with a solvent inlet and a catalyst inlet and finally with a thermometer.

The apparatus for dehydrating the solvent is composed of a unit consisting of two distillation flasks mounted in series.

In the first of these two flasks, the solvent can be boiled under reflux, after which it is distilled so as to admit it to the second flask by interrupting the cooling system of the reflux device. In the second flask, the dehydration is ensured by associating with the solvent collected and derived from the distillation in the first flask, one or a number of compounds which react with water and which may eventually serve as a dehydration indicator. Thus, for example, use can advantageously be made of naphthalene and sodium in order to form naphthalene-sodium which has a green colour in the absence of water.

In the tests carried out by the applicants, tetrahydrofuran was utilized as a solvent having the following characteristics:

Dielectric constant _____ 2.365 at 25° C.
Dipolar moment _____ 1.77 D.

In practice, the method is carried out in the following manner:

Dehydration of the solvent

The solvent is put to boil under reflux in the presence of potassium in the first flask of the dehydration apparatus which has been referred to above, with cooling of the reflux condenser. When this boiling under reflux has been effected, the first and second flasks of the dehydration unit are put into communication and the cooling system of the reflux column of the first flask is interrupted. The solvent (tetrahydrofuran) then distills into the second flask.

When the solvent has been collected in this latter, naphthalene and freshly-cut sodium in excess are introduced as a dehydration agent and as an indicator. The reaction is allowed to develop in this flask entirely closed and with agitation, until the appearance of a green tint becomes persistent.

As the reaction vessel can itself be coupled to the second flask of the solvent dehydration unit, this vessel is put into communication with the flask containing the dehydrated solvent, after having carefully deaerated the reaction vessel, for example by creating a vacuum in it or by scavenging it with an inert gas. The transfer of the solvent into the reaction vessel is carried out by distillation. By this means, there becomes available a perfectly dehydrated solvent.

Copolymerization reaction proper

The reaction vessel is cooled to $-78°$ C. by a mixture of butanol and carbon dioxide snow or acetone and carbon dioxide snow.

Solvent vapours are then admitted into the reaction vessel by distillation of the solvent in the flask in which it is contained.

When the tetrahydrofuran solvent has distilled into the reaction vessel, the pipe connecting the flask containing the solvent to the reaction vessel is closed and the introduction of the monomers into the reaction vessel is then proceeded with, while determining the weights admitted.

In the test carried out by the applicants, no polymerization of the mixture was detected in the absence of catalysts, even after a period of contact of the monomers in the presence of the solvent, of a minimum of one hour.

The test was then continued in the presence of a catalyst.

The catalyst employed and which is given here by way of example was tri-n-butylamine, known as a polymerization catalyst of formaldehyde.

About 0.15 gram of distilled tri-n-butylamine per 100 grams of monomers was introduced, while proceeding to agitation of the solution in the reaction vessel.

The test made by the applicants was carried out in such manner as to retain a ratio of catalyst to the sum of the monomers comprised between 0.15% and 0.20% by weight.

The applicants have also made tests using naphthalene-sodium as a catalyst, although this latter is not known as a polymerization catalyst of either of the monomers in question. This naphthalene-sodium was employed in solution in the solvent applied and previously prepared before use.

The table given below gives the results obtained during the course of the various tests carried out by the applicants and shows the effectiveness of naphthalene-sodium as a catalyst.

3. A method as claimed in claim 1 wherein said reaction is carried out at $-65°$ C.

4. A method as claimed in claim 2 wherein said reaction is carried out at $-65°$ C.

5. A method of polymerization of formaldehyde comprising contacting monomeric formaldehyde with naphthalene-sodium catalyst and dehydrated tetrahydrofuran solvent in a reaction zone maintained at a temperature between $-61°$ and $-65°$ C.

| Monomers in percent $CH_3CHO:HCHO$ | Catalyst | Temp., °C. | Product obtained | | | | Remarks |
| --- | --- | --- | --- | --- | --- | --- | --- |
| | | | Efficiency, percent | Melting temp., °C. | Composition | Percent | |
| Equal volumes | Tri-butylamine | $-61$ | | 105–110 | $CH_3CHO$ $HCHO$ | 18 82 | |
| 82.8:17.2 | Naphthalene-sodium | $-65$ | 17.5 | | $CH_3CHO$ $HCHO$ | 5.5 94.5 | |
| 82:18 | Tri-butylamine | $-65$ | 18 | 121 | $CH_3CHO$ $HCHO$ | 18 82 | |
| 100:0 | ....do | $-65$ | | | | | No polymerization. |
| 100:0 | Naphthalene-sodium | $-65$ | | | | | Do. |

These products which are related to those described in the applicants' French Patent No. 1,288,735 having for its title "Copolymers of Formaldehyde and Acetaldehyde and Their Method of Manufacture" of April 23, 1960, can be stabilized for example under the same conditions as those described in the said patent.

The stabilized copolymers obtained by the method of the invention can be moulded, poured, etc. and may find a large number of industrial applications which are known for these products.

Moreover, it is understood that the present invention has only been described purely by way of explanation and not in any limitative sense, and that any useful modification may be made to it without departing from its scope.

We claim:

1. A method for producing a copolymer of formaldehyde and acetaldehyde comprising reacting formaldehyde and acetaldehyde in the presence of naphthalene-sodium catalyst and dehydrated tetrahydrofuran solvent in a reaction zone maintained at a temperature between $-61°$ C. and $-65°$ C.

2. A method as claimed in claim 1 wherein the ratio of catalyst to the sum of said monomers is between 0.15% and 0.20% by weight.

References Cited by the Examiner

UNITED STATES PATENTS

| | | | |
| --- | --- | --- | --- |
| 2,768,994 | 10/1956 | MacDonald | 260—67 |
| 2,848,437 | 8/1958 | Langsdorf et al. | 260—67 |
| 2,989,508 | 6/1961 | Hudgin et al. | 260—67 |
| 3,030,315 | 4/1962 | Bailey | 260—2 |
| 3,067,174 | 12/1962 | Sullivan | 260—67 |

FOREIGN PATENTS

| | | |
| --- | --- | --- |
| 220,367 | 3/1962 | Austria. |
| 870,775 | 6/1961 | Great Britain. |

OTHER REFERENCES

Degering et al.: Journ. of Polymer Sci., vol. VII, No. 6, December 1951, pp. 653–656.

Paul et al.: J.A.C.S., 78 (1956), 116–20.

Rochow et al.: The Chemistry of Organometallic Compounds, John Wiley & Sons, N.Y. (1957), page 65.

WILLIAM H. SHORT, *Primary Examiner.*

L. M. MILLER, *Assistant Examiner.*